(12) United States Patent
Chang et al.

(10) Patent No.: US 9,258,618 B2
(45) Date of Patent: Feb. 9, 2016

(54) CHANNELIZATION METHOD OF DIGITAL CONTENT AND AUDIO-VIDEO SERVER SYSTEM

(71) Applicant: Tatung Company, Taipei (TW)

(72) Inventors: Chung-Chi Chang, Taipei (TW); I-Cheng He, Taipei (TW); Kuang-Min Hsu, Taipei (TW); Hao-Yu Chen, Taipei (TW)

(73) Assignee: Tatung Company, Taipei (TW)

( * ) Notice: Subject to any disclaimer, the term of this patent is extended or adjusted under 35 U.S.C. 154(b) by 0 days.

(21) Appl. No.: 13/792,213

(22) Filed: Mar. 11, 2013

(65) Prior Publication Data

US 2014/0101704 A1 Apr. 10, 2014

(30) Foreign Application Priority Data

Oct. 8, 2012 (TW) .............................. 101137150 A (51) Int. Cl.

| | | |
|---|---|---|
| *G06F 3/00* | (2006.01) | |
| *G06F 13/00* | (2006.01) | |
| *H04N 5/445* | (2011.01) | |
| *H04N 21/482* | (2011.01) | |
| *H04N 21/81* | (2011.01) | |
| *H04N 21/858* | (2011.01) | |

(52) U.S. Cl.
CPC ......... *H04N 21/482* (2013.01); *H04N 21/8173* (2013.01); *H04N 21/858* (2013.01)

(58) Field of Classification Search
USPC ................................................ 725/38, 56, 57
See application file for complete search history.

(56) References Cited

U.S. PATENT DOCUMENTS

| | | | | |
|---|---|---|---|---|
| 6,195,089 | B1 * | 2/2001 | Chaney et al. .................. | 725/56 |
| 2005/0010947 | A1 * | 1/2005 | Ellis ................................ | 725/38 |
| 2007/0162951 | A1 | 7/2007 | Rashkovskiy et al. | |
| 2008/0196078 | A1 | 8/2008 | Steele et al. | |
| 2011/0173666 | A1 * | 7/2011 | Yu ...................... | H04N 7/17318 725/47 |
| 2012/0124630 | A1 * | 5/2012 | Wellen et al. ................. | 725/109 |
| 2012/0210367 | A1 * | 8/2012 | Lee et al. ........................ | 725/56 |

FOREIGN PATENT DOCUMENTS

CN 1371573 9/2002

OTHER PUBLICATIONS

"Office Action of Taiwan Counterpart Application", issued on May 20, 2015, p. 1-p. 7.

* cited by examiner

*Primary Examiner* — Nnenna Ekpo
(74) *Attorney, Agent, or Firm* — Jianq Chyun IP Office (57) ABSTRACT

A channelization method of digital content and an audio-video server system are provided. A received operational behavior is packaged as an execution module, and the execution module is associated with a channel number. A correlation between the channel number and the execution module is recorded in a local channel list. Accordingly, when a switch command that contains the channel number is received, the execution module corresponding to the channel number is obtained from the local channel list, so as to perform the operational behavior to use the digital content.

8 Claims, 6 Drawing Sheets

CHANNELIZATION METHOD OF DIGITAL CONTENT AND AUDIO-VIDEO SERVER SYSTEM

CROSS-REFERENCE TO RELATED APPLICATION

This application claims the priority benefit of Taiwan application serial no. 101137150, filed on Oct. 8, 2012. The entirety of the above-mentioned patent application is hereby incorporated by reference herein and made a part of this specification.

BACKGROUND OF THE INVENTION

1. Field of the Invention

The invention relates to management of television (TV) channels. More particularly, the invention relates to a channelization method of digital content and an audio-video server system.

2. Description of Related Art

Since the internet has been applied more and more extensively, televisions (TVs) capable of being connected to the internet have become more and more popular as well. For instance, users are allowed to browse web-pages or watch online video clips through the TVs that are connected to the internet.

Nevertheless, it is not convenient to connect the TVs to the internet, for it is rather difficult to input complicated operational commands with use of the TV remote control, e.g., a command of inputting a uniform resource locator (URL) of a user-desired site. In addition, although an increasing number of application programs may be supported by and operated on the TVs, it is not easy to execute the application programs by using the conventional remote control.

SUMMARY OF THE INVENTION

The invention is directed to a channelization method of digital content and an audio-video server system which may easily and effectively broadcast the digital content with use of an audio-video player.

In an embodiment of the invention, a channelization method of digital content suitable for being conducted on an audio-video player is provided. The channelization method includes receiving an operational behavior for using the digital content, packaging the operational behavior as an execution module, and associating the execution module with a channel number. In the channelization method, a correlation between the channel number and the execution module is recorded in a local channel list, and when a switch command that contains the channel number is received, the execution module corresponding to the channel number is obtained from the local channel list, so as to perform the operational behavior to use the digital content.

According to an embodiment of the invention, the audio-video player includes an input unit. After packaging the operational behavior as the execution module, the channelization method further includes receiving a channelization command from the input unit and receiving a combination of numbers from the input unit to apply the combination of numbers as the channel number.

According to an embodiment of the invention, the audio-video player is connected to a server through internet, and the channelization method further includes uploading the correlation between the channel number and the execution module to a remote channel list and periodically obtaining the correlation recorded in the remote channel list from the server, so as to update the local channel list of the audio-video player.

According to an embodiment of the invention, the audio-video player is connected to an electronic device through internet, and the channelization method further includes receiving the correlation between the channel number and the execution module from the electronic device, so as to update the local channel list.

According to an embodiment of the invention, before associating the execution module with the channel number, the channelization method further includes receiving the channel number and determining whether the channel number is used. If the channel number is used, the channelization method further includes receiving another channel number.

According to an embodiment of the invention, the operational behavior includes at least one operational command, and the step of performing the operational behavior to use the digital content includes performing a corresponding action corresponding to the at least one operational command.

According to an embodiment of the invention, the step of performing the operational behavior to use the digital content includes displaying a search result of a search engine.

According to an embodiment of the invention, the step of performing the operational behavior to use the digital content includes executing an application program corresponding to a memory address.

In an embodiment of the invention, an audio-video server system that includes a remote device and an audio-video player is provided. The remote device receives an operational behavior to use digital content and packages the operational behavior as an execution module. The audio-video player is connected to the remote device through internet. Besides, the audio-video player receives the execution module from the remote device through the internet, associates the execution module with a channel number, and records a correlation between the channel number and the execution module in a local channel list. When the audio-video player receives a switch command that contains the channel number, the audio-video player obtains the execution module corresponding to the channel number from the local channel list, so as to perform the operational behavior to use the digital content.

In view of the above, according to the channelization method of digital content and the audio-video server system described herein, the operational behavior for broadcasting the digital content may be packaged as the execution module, and the execution module may be associated with the channel number. When the switch command that contains the channel number is received, the execution module corresponding to the channel number is obtained to perform the operational behavior to use the digital content. Thereby, the digital content may be easily and effectively broadcast with use of the audio-video player.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In an embodiment of the invention, a channelization method of digital content is provided. By conducting this method, the digital content may be broadcast in form of television (TV) channels, i.e., when a user inputs a channel number, a normal operational command may be simulated to broadcast the digital content corresponding to the channel number. For instance, when a user inputs a channel number "800" through a remote control, an audio-video player may according to the input channel number look for an appropriate execution module, so as to browse web-pages, broadcast audio-video files, or execute application programs according to the operational command in the execution module. Thereby, the digital content may be easily and effectively broadcast with use of the audio-video player. Moreover, in an embodiment of the invention, an audio-video player and an audio-video server system that may be applied to conduct said channelization method of digital content are also provided. In order to make the invention more comprehensible, embodiments are described below as examples to prove that the invention can actually be realized.

First Embodiment

Figure 1:
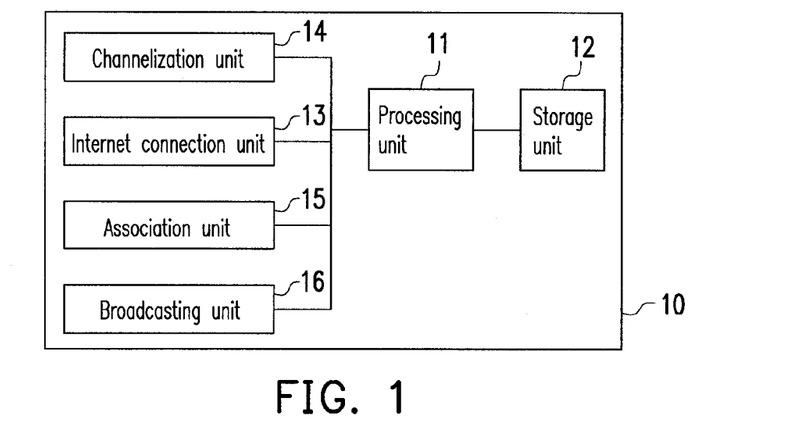
FIG. 1 is a block diagram illustrating an audio-video player according to a first embodiment of the invention.

FIG. 1 is a block diagram illustrating an audio-video player according to a first embodiment of the invention. With reference to FIG. 1, the audio-video player 10 may be a smart TV. Here, the audio-video player 10 includes a processing unit 11, a storage unit 12, an internet connection unit 13, a channelization unit 14, an association unit 15, and a broadcasting unit 16.

The processing unit 11 may be a controller or a central processing unit (CPU), whereas the invention is not limited thereto. According to the present embodiment, the processing unit 11 may drive the internet connection unit 13, the channelization unit 14, the association unit 15, and the broadcasting unit 16. Here, the channelization unit 14, the association unit 15, and the broadcasting unit 16 refer to a chip constituted by one or more logic gate circuits. In other embodiments of the invention, the channelization unit 14, the association unit 15, and the broadcasting unit 16 may refer to a process that is written in a programming language, constituted by plural commands, and stored in the storage unit 12.

The storage unit 12 may refer to a variety of non-volatile memories or a combination thereof, e.g., a read-only memory (ROM) and/or a flash memory. Besides, the storage unit 12 may further include a hard disc drive, an optical disc, an external storage device (e.g., a memory card, a portable hard drive), or a combination thereof, which should not be construed as a limitation to the invention.

The internet connection unit 13 serves to connect the audio-video player 10 to a wired/wireless network through wired/wireless internet connection. Here, the internet connection unit 13 may include a network interface card, an RF circuit, a Bluetooth signal transceiver, an infrared ray signal transceiver, or any other wired/wireless signal receiving and transmitting device.

The channelization unit 14 serves to receive an operational behavior of a user. Here, the operational behavior refers to an operational command or a series of operational commands for using or broadcasting digital content, for instance. Said digital content may be video clips, music, web-pages, application programs, and so forth. The channelization unit 14 may also serve to package the operational behavior as an execution module, so as to subsequently execute the execution module to use the corresponding digital content. For instance, if a user intends to watch an online video clip through a smart TV, the user may first connect the audio-video player 10 to the internet, find the user-desired online video clip through an online search engine (e.g., Google), and broadcast the online video clip on the audio-video player 10. The operational commands of said three steps are collected and packaged as one execution module by the channelization unit 14. Alternatively, the user may execute communication application programs on the audio-video player 10, e.g., the user may start to make video calls after connecting a friend on the contact list, and the operational commands of said three steps are collected and packaged as one execution module by the channelization unit 14. After that, the user may directly make video calls with the friend on the contact list after inputting a specific channel number.

The association unit 15 serves to associate the execution module with the channel number. For instance, the association unit 15 may associate the execution module with the channel number "123" or "888" of a smart TV, according to which it is determined whether the execution module is executed. The association unit 15 may also record the correlation between the channel number and the execution module in the local channel list which may be stored in the storage unit 12.

The broadcasting unit 16 serves to perform operational behaviors in the execution module. In particular, when the broadcasting unit 16 receives the switch command that includes the channel number (e.g., a user inputs the channel number to the audio-video player 10 through a remote control), the broadcasting unit 16 may obtain the execution module corresponding to the channel number from the local channel list stored in the storage unit 12, so as to perform the operational behaviors to use the corresponding digital content. For instance, the broadcasting unit 16 may execute one operational command or a series of operational commands for broadcasting previously watched online video clips, displaying a search result of a search engine, or executing the application program corresponding to a memory address. In another example, when the operational behavior packaged by the channelization unit 14 includes a series of operational commands of executing one or more application programs installed in the audio-video player 10, the broadcasting unit 16 may, according to the operational commands, learn a trigger command of triggering the one or more application programs and relevant information including memory addresses or shortcut addresses, and thereby the broadcasting unit 16 may execute the corresponding application program.

Steps in a channelization method are described below with reference to the aforementioned audio-video player.

Figure 2:
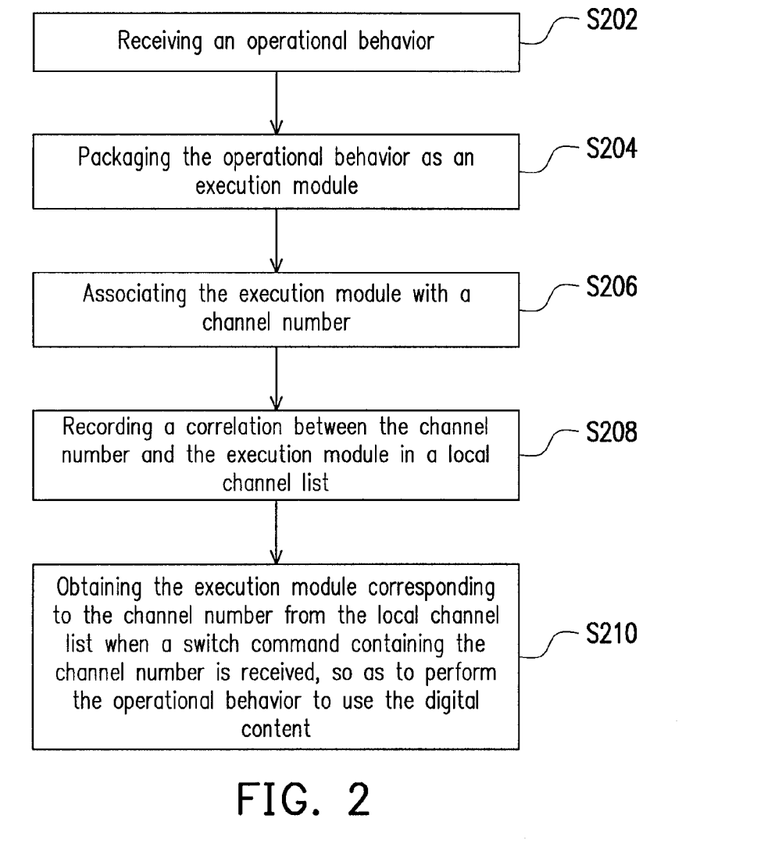
FIG. 2 is a flowchart illustrating a channelization method of digital content according to the first embodiment of the invention.

FIG. 2 is a flowchart illustrating a channelization method of digital content according to the first embodiment of the invention. With reference to FIG. 1 and FIG. 2, in step S202, the channelization unit 14 receives an operational behavior that is exemplarily generated by an input operation of a user. For instance, when a user watches an online video clip, the channelization unit 14 may record a series of operating commands of broadcasting said online video clip.

In step S204, the channelization unit 14 packages the received operational behavior as an execution module. In step S206, the association unit 15 associates the execution module with a channel number that is input by a user, for instance. In step S208, the association unit 15 records a correlation between the channel number and the execution module in a local channel list stored in the storage unit 12. In step S210, when the broadcasting unit 16 receives a switch command that includes the channel number (e.g., a user inputs the channel number to the through a remote control), the broadcasting unit 16 obtains the execution module corresponding to the channel number from the local channel list, so as to perform the operational behavior to use the corresponding digital content.

Second Embodiment

The hardware structure described in the second embodiment is substantially the same as that described in the first embodiment, while the difference therebetween lies in that the association unit described in the second embodiment may further obtain channel numbers that have not been used and ensure that the channel number used by the association unit has not been used. Moreover, the execution module will not be executed in an incorrect manner because the association unit is able to prevent the use of the same channel number twice.

Figure 3:
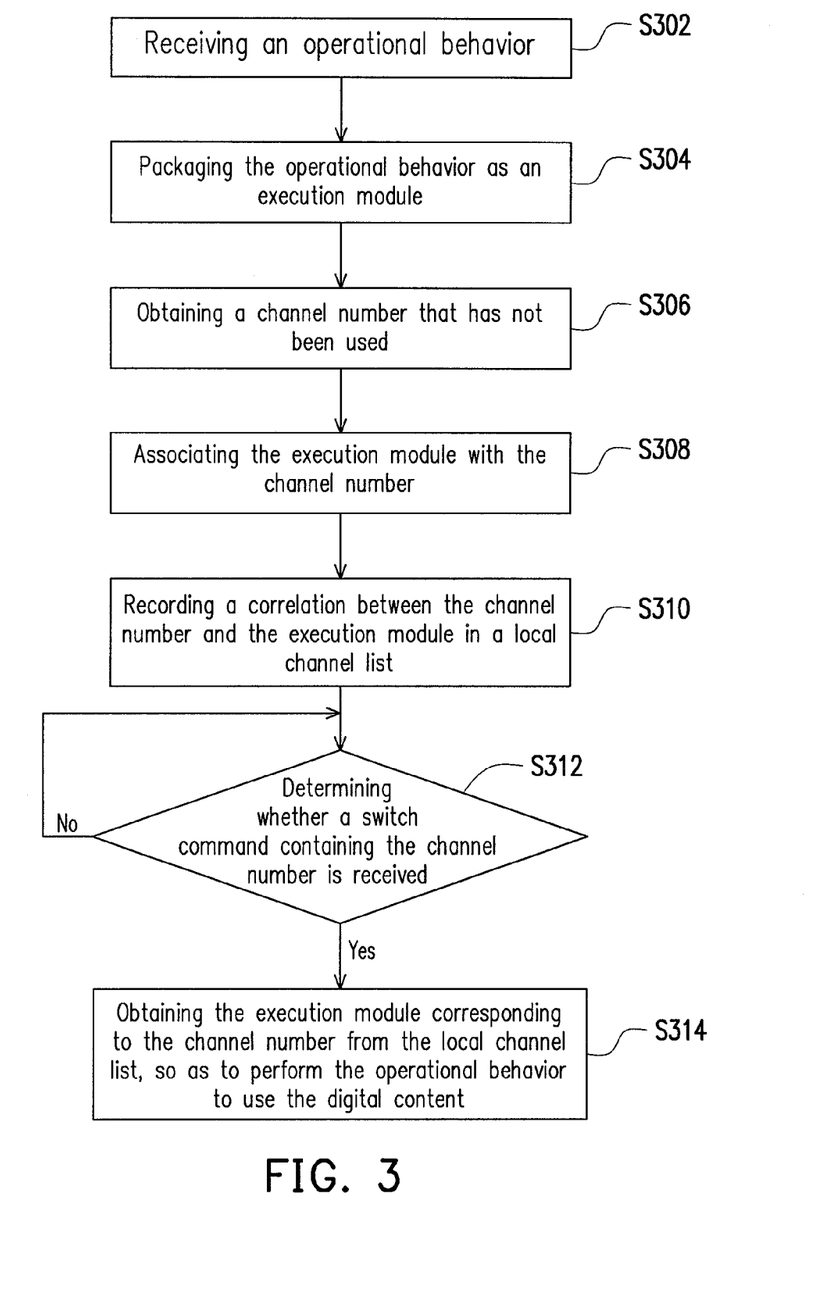
FIG. 3 is a flowchart illustrating a channelization method of digital content according to a second embodiment of the invention.

FIG. 3 is a flowchart illustrating a channelization method of digital content according to the second embodiment of the invention. With reference to FIG. 1 and FIG. 3, in step S302, the channelization unit 14 receives an operational behavior. In step S304, the channelization unit 14 packages the received operational behavior as an execution module. In step S306, the association unit 15 obtains a channel number that has not been used. For instance, the association unit 15 may check the local channel list and thereby exclude the channel numbers that have been associated with TV channels or other execution modules, so as to obtain the channel number that has not been used yet. In step S308, the association unit 15 associates the execution module with the channel number. In step S310, the association unit 15 records a correlation between the channel number and the execution module in a local channel list stored in the storage unit 12.

In step S312, the broadcasting unit 16 determines whether a switch command containing the channel number is received. When the broadcasting unit 16 receives the switch command containing the channel number, the broadcasting unit 16 in step S314 obtains the execution module corresponding to the channel number from the local channel list, so as to perform the operational behavior to use the digital content. If, however, the broadcasting unit 16 does not receive the switch command containing the channel number in step S312, the broadcasting unit 16 repeatedly performs step S312.

Third Embodiment

The hardware structure described in the third embodiment is substantially similar to that described in the first embodiment, while the difference therebetween lies in that the audio-video player described in the third embodiment may include a host (e.g., a smart TV) and an input unit (e.g., a remote control of the smart TV). A user may, through the input unit, issue a channelization command and a combination of channel numbers to the host, so as to inform the host of performing the process of channelizing digital content.

Figure 4:
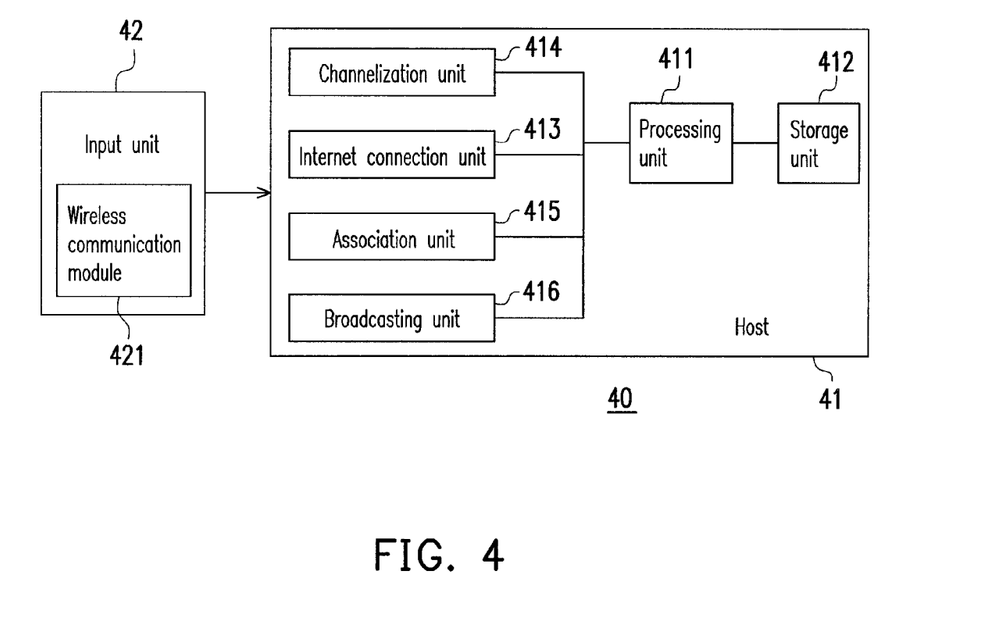
FIG. 4 is a block diagram illustrating an audio-video player according to a third embodiment of the invention.

FIG. 4 is a block diagram illustrating an audio-video player according to the third embodiment of the invention. With reference to FIG. 4, an audio-video player 40 includes a host 41 and an input unit 42. The host 41 includes a processing unit 411, a storage unit 412, an internet connection unit 413, a channelization unit 414, an association unit 415, and a broadcasting unit 416. Since the processing unit 411, the storage unit 412, the internet connection unit 413, the channelization unit 414, the association unit 415, and the broadcasting unit 416 are respectively the same as the processing unit 11, the storage unit 12, the internet connection unit 13, the channelization unit 14, the association unit 15, and the broadcasting unit 16 depicted in FIG. 1, no repetitive description is provided hereinafter.

The input unit 42 serves to remotely control the host 41 to switch channels. In the present embodiment, the input unit 42 may run a wireless communication module 421. Particularly, the input unit 42 serves to receive a user's operational behavior of controlling the host 41. For instance, a user's operational behavior of controlling the host 41 to broadcast an online video clip through a remote control or a smart phone. The input unit 42 may then send the operational behavior to the host 41 through the wireless communication module 421. In the present embodiment, the input unit 42 may be an electronic device (e.g., a remote control, a desktop computer, a notebook computer, or a smart phone) that may remotely control the host 110. Here, the wireless communication module 421 may be a radio frequency (RF) circuit, a Bluetooth signal transceiver, an infrared ray signal transceiver, and so on. According to the present embodiment, the input unit 42 may be configured in the host 41, may receive the user's operational behavior performed on the host 41, and may send the operational behavior to the channelization unit 414.

Figure 5:
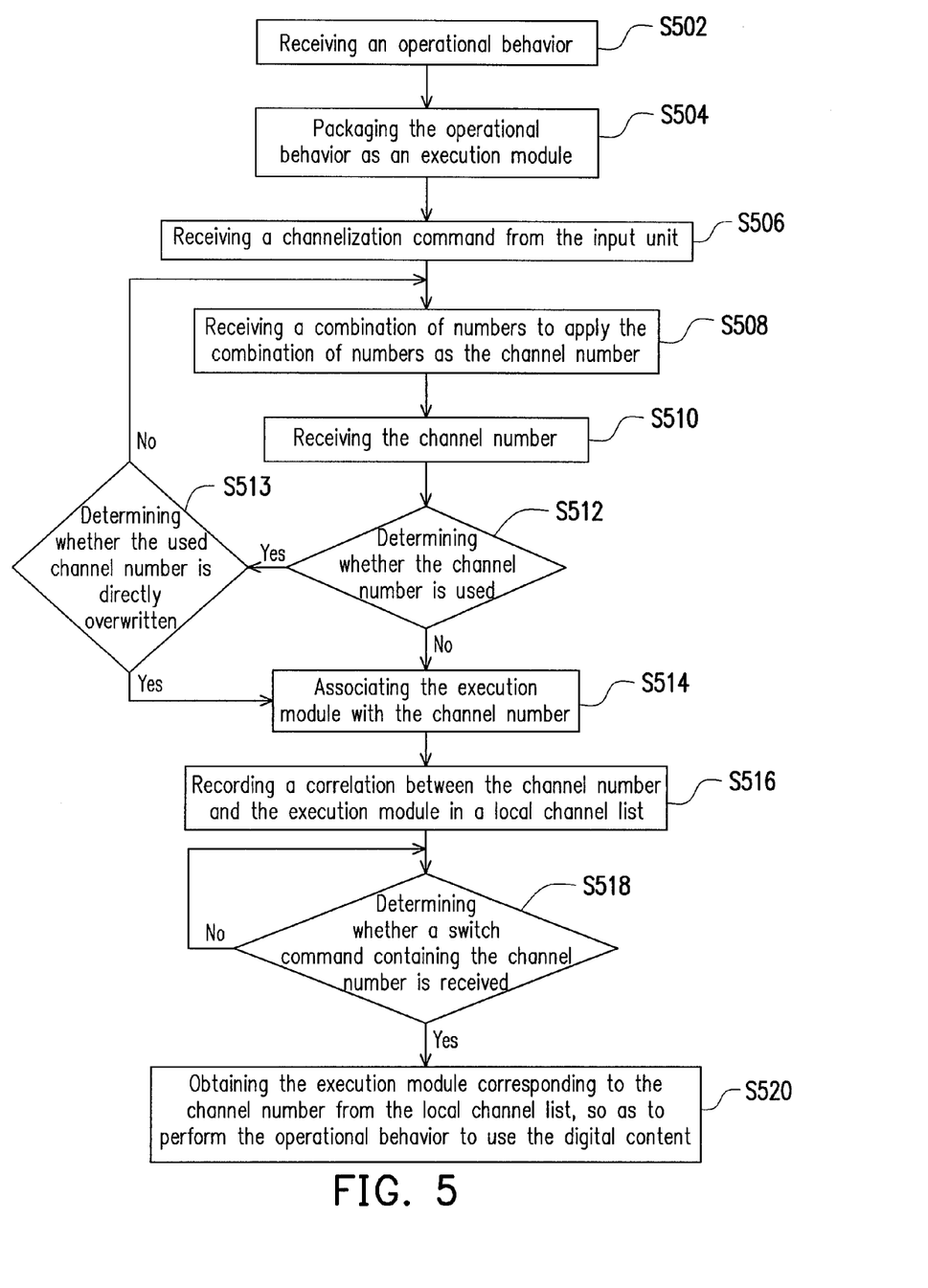
FIG. 5 is a flowchart illustrating a channelization method of digital content according to the third embodiment of the invention.

FIG. 5 is a flowchart illustrating a channelization method of digital content according to the third embodiment of the invention. With reference to FIG. 5, in step S502, the channelization unit 414 receives an operational behavior. In step S504, the channelization unit 414 packages the received operational behavior as an execution module. In step S506, the channelization unit 414 receives a channelization command from the input unit 42. In step S508, the channelization unit 414 receives a combination of numbers from the input unit 42 to apply the combination of numbers as the channel number. For instance, a user may press the channelization button on the remote control (i.e., the input unit 42) and input a combination of numbers (e.g., "5," "6," and "3") associated with the audio and video files currently broadcast by the host 41, so as to send the channelization command and the combination of numbers (e.g., "5," "6," and "3") to the host 41. After the host 41 receives the channelization command and the combination of numbers, the channelization unit 414 may apply the combination of numbers as the channel number and associate the channel number with the digital content broadcast by the host 41.

In step S510, the channelization unit 414 receives the channel number with said combination of numbers and transmits the channel number to the association unit 415. In step S512, the association unit 415 determines whether the channel number is used. If the association unit 415 determines that the channel number is used, a user in step S513 decides whether the used channel number should be directly overwritten. If the user agrees to overwrite the used channel number, the association unit 415 in step S514 directly updates the execution module corresponding to the used channel number (i.e., associates the execution module with the channel number). If the user does not agree to overwrite the used channel number, the association unit 415 informs the channelization unit 414 of receiving another channel number and generating the channel number (i.e., the steps S508 and S510 are repeatedly performed). In another embodiment of the invention, if the association unit 415 determines that the channel number is used, the step S508 may be directly and repeatedly performed after the step S512, and the channelization unit 414 again receives another combination of numbers from the input unit 42 to obtain another channel number. After the association unit 415 in step S512 determines that the channel number obtained by the channelization unit 414 is not used, the association unit 415 further performs next step.

Specifically, in step S512, if the association unit 415 determines that the channel number obtained by the channelization unit 414 is not used, the association unit 415 directly associates the execution module with the channel number that is not used. In step S516, the association unit 415 records a correlation between the channel number and the execution module in a local channel list stored in the storage unit 412. In step S518, the broadcasting unit 416 determines whether a switch command containing the channel number is received. When the broadcasting unit 416 receives the switch command containing the channel number, the broadcasting unit 416 in step S520 obtains the execution module corresponding to the channel number from the local channel list, so as to perform the operational behavior to use the digital content. If, however, the broadcasting unit 416 does not receive the switch command containing the channel number in step S518, the broadcasting unit 416 repeatedly performs step S518.

Fourth Embodiment

An audio-video server system is proposed in the fourth embodiment, and the audio-video server system may include the audio-video player and the remote device described in the first embodiment to the third embodiment. The difference between this embodiment and the first to third embodiments lies in that the audio-video player described in the present embodiment updates its local channel list according to a remote channel list of the remote device. Thereby, the user is able to easily determine the correlation between the digital content and the channel number through an electronic device.

Figure 6:
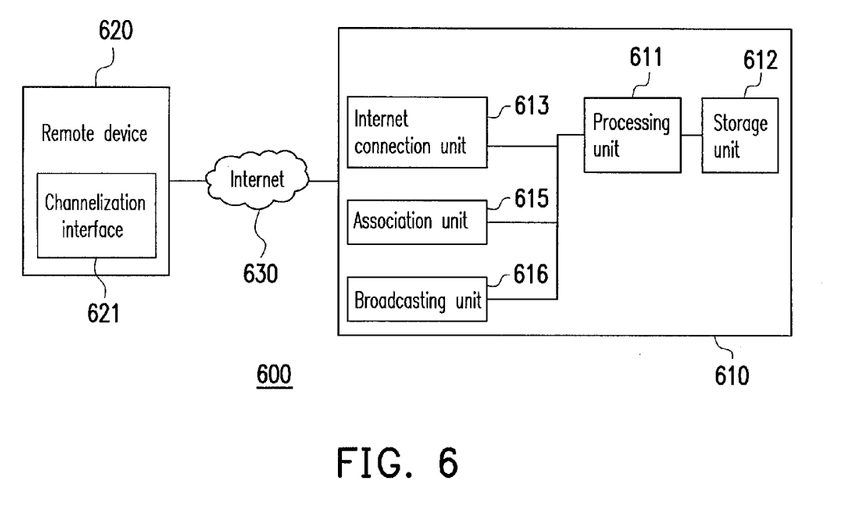
FIG. 6 is a schematic diagram illustrating an audio-video server system according to a fourth embodiment of the invention.

FIG. 6 is a schematic diagram illustrating an audio-video server system according to the fourth embodiment of the invention. With reference to FIG. 6, an audio-video server system 600 includes an audio-video player 610 and a remote device 620.

The remote device 620 serves to receive an operational behavior to use digital content and package the operational behavior as an execution module. Particularly, in the present embodiment, the remote device 620 includes a channelization interface 621 that is substantially similar to the channelization unit 14, and therefore no further description is provided hereinafter. If there is any inquiry about the way to operate the channelization interface 621, the explanation may be found in the above detailed description regarding the channelization unit 14 depicted in FIG. 1. The remote device 620 in the present embodiment may be an electronic device, such as a smart phone, a notebook computer, or a desktop computer, which should not be construed as a limitation to the invention.

The audio-video player 610 is connected to the remote device 620 through internet 630. Generally, the audio-video player 610 may receive the execution module (packaged by the channelization interface 621 of the remote device 620) from the remote device 620 through the internet 630 and associate the execution module with the channel number. Here, the channel number may be obtained according to the combination of numbers received by the channelization interface 621 of the remote device 620 or may be obtained by an input from the audio-video player 610. For instance, the audio-video player 610 may generate the channel number by applying the default combination of numbers, or a user may input the channel number through the audio-video player 610. The audio-video player 610 may also record a correlation between the channel number and the execution module in a local channel list stored in the storage unit 612. When the audio-video player 610 receives a switch command that contains the channel number, the audio-video player 610 obtains the execution module corresponding to the channel number from the local channel list, so as to perform the operational behavior to use the digital content.

In the present embodiment, the audio-video player 610 may include a processing unit 611, a storage unit 612, an internet connection unit 613, an association unit 615, and a broadcasting unit 616. Since the processing unit 611, the storage unit 612, the internet connection unit 613, the association unit 615, and the broadcasting unit 616 are respectively similar to the processing unit 11, the storage unit 12, the internet connection unit 13, the association unit 15, and the broadcasting unit 16 depicted in FIG. 1, no repetitive description is provided hereinafter.

For instance, if the remote device 620 is a smart phone, the channelization interface 614 is an application program in the smart phone. When a user watches video clips, listens to music, or browses web-pages on the remote device 620, the channelization interface 620 may be employed to package one or a series of operational commands (required for broadcasting said digital content) as an execution module, and the channel number associated with the execution module may be determined. The user then sends the correlation between the channel number and the execution module to the audio-video player 610 through the remote device 620, such that the audio-video player 610 may accordingly update the local channel list stored in the audio-video player 610. Alternatively, the audio-video player 610 may, on a periodic basis or according to a specific rule, download the correlation between the latest channel number and the execution module from an electronic device that is connected to the internet, which should not be construed as a limitation to the invention.

Fifth Embodiment

The structure of the system described in the fifth embodiment is substantially the same as that described in the fourth embodiment, while the difference therebetween lies in that the audio-video player described in the fifth embodiment may include a channelization unit and may package the operational behavior as explained above. That is, according to the present embodiment, the step of packaging the operational behavior may be performed on the remote device and the audio-video player, respectively.

Figure 7:
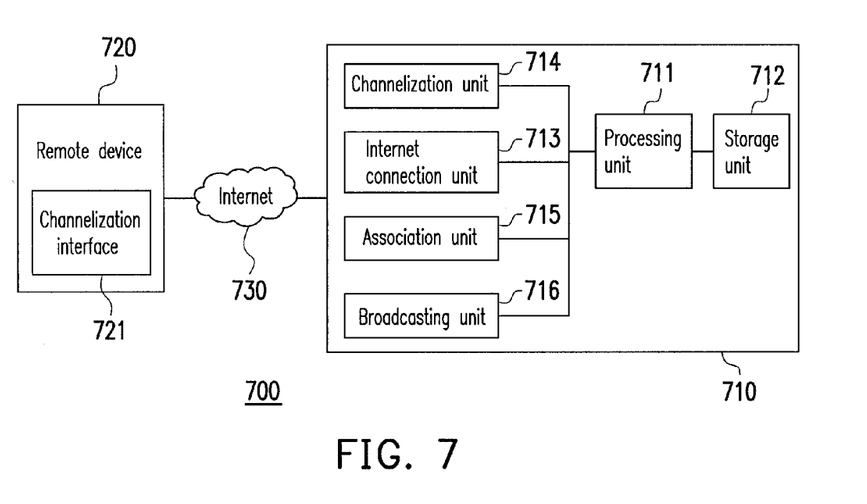
FIG. 7 is a schematic diagram illustrating an audio-video server system according to a fifth embodiment of the invention.

FIG. 7 is a schematic diagram illustrating an audio-video server system according to the fifth embodiment of the invention. With reference to FIG. 7, the audio-video player 710 includes a processing unit 711, a storage unit 712, an internet connection unit 713, an association unit 715, and a broadcasting unit 716. Since the processing unit 711, the storage unit 712, the internet connection unit 713, a channelization unit 714, the association unit 715, and the broadcasting unit 716 are respectively similar to the processing unit 11, the storage unit 12, the internet connection unit 13, the channelization unit 14, the association unit 15, and the broadcasting unit 16 depicted in FIG. 1, no repetitive description is provided hereinafter. The remote device 720 includes the channelization interface 721, the functions of which are similar to those of the channelization interface 621 of the remote device 620 depicted in FIG. 6. Therefore, further descriptions will be omitted hereinafter.

Unlike the audio-video player 610 depicted in FIG. 6, the audio-video player 710 further includes the channelization unit 714, so as to receive the operational behavior and package the operational behavior as the execution module in the audio-video player 710. Thereby, the audio-video player 710 is not only able to download and update the local channel list (stored in the storage unit 712) from the remote device 720 but also capable of establishing the correlation between the execution module and the channel number through the channelization unit 714 and updating the local channel list.

It should be mentioned that the way to implement the audio-video player 710 is not limited to the present embodiment. For instance, the audio-video player 710 and the audio-video player 40 described in the third embodiment may be implemented in the same manner.

Sixth Embodiment

The structure of the system described in the sixth embodiment is substantially the same as that described in the fifth embodiment, while the difference therebetween lies in that the audio-video server system described in the sixth embodiment further includes a server. Thereby, the remote device may record the correlation between the channel number and the execution module in the server, and the audio-video player may periodically obtain the recorded correlation from the server, so as to update the local channel list stored in the audio-video player.

Figure 8:
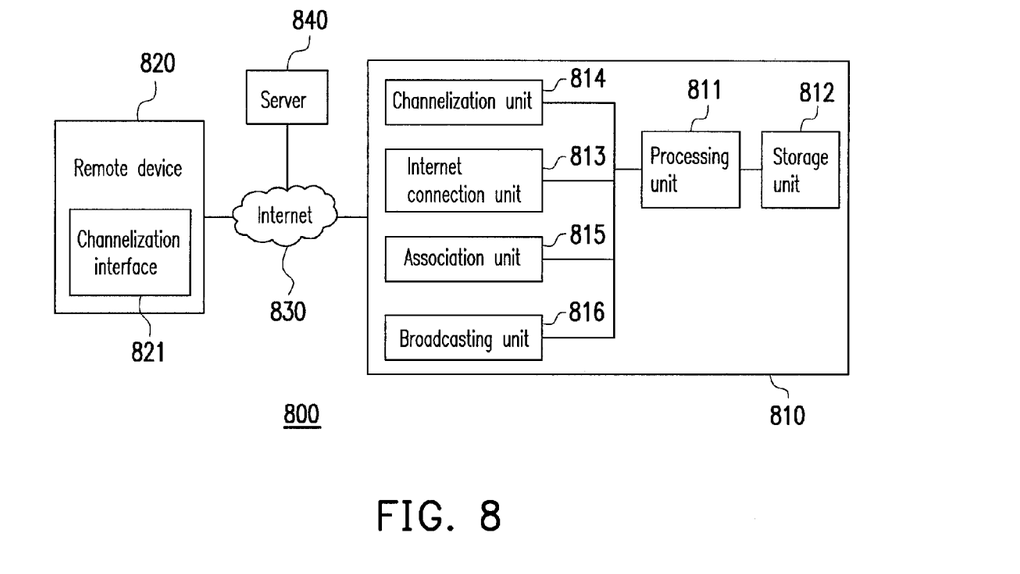
FIG. 8 is a schematic diagram illustrating an audio-video server system according to a sixth embodiment of the invention.

FIG. 8 is a schematic diagram illustrating an audio-video server system according to the sixth embodiment of the invention. With reference to FIG. 8, the audio-video player 810 includes a processing unit 811, a storage unit 812, an internet connection unit 813, a channelization unit 814, an association unit 815, and a broadcasting unit 816. Since the processing unit 811, the storage unit 812, the internet connection unit 813, the channelization unit 814, the association unit 815, and the broadcasting unit 816 are respectively similar to the processing unit 11, the storage unit 12, the internet connection unit 13, the channelization unit 14, the association unit 15, and the broadcasting unit 16 depicted in FIG. 1, no repetitive description is provided hereinafter. The remote device 820 includes the channelization interface 821, the functions of which are similar to those of the channelization interface 621 of the remote device 620 depicted in FIG. 6. Therefore, further descriptions will be omitted hereinafter.

Compared to the audio-video server system 700 depicted in FIG. 7, the audio-video server system 800 further includes a server 840. In the present embodiment, the server 840 may refer to a normal computer host or a server host.

Particularly, the server 840 is connected to the remote device 820 and the audio-video player 810 through internet 830. The server 840 stores a remote channel list that serves to record the correlation between the execution module and the channel number; here, the correlation is uploaded by the remote device 820. The audio-video player 810 may also periodically download the correlation recorded in the remote channel list from the server through the internet, so as to update the local channel list stored in the audio-video player 810. For instance, the broadcasting unit 816 of the audio-video player 810 may periodically (e.g., every 24 hours) connect the server 840 to download the recorded correlation from the remote channel list.

Note that the internet connection unit, the channelization unit, the channelization interface, the association unit, and the broadcasting unit described in the previous embodiments are hardware devices constituted by logic circuit devices and may respectively perform the functions described above, for instance. In addition, the internet connection unit, the channelization unit, the channelization interface, the association unit, and the broadcasting unit described in the previous embodiments may also be implemented in form of software applications or firmware stored in hard disc drives or memories of the audio-video player/the remote device. For instance, in an exemplary embodiment, the software applications or firmware may be installed into the processor of the audio-video player for performing said functions To sum up, according to the channelization method of digital content and the audio-video server system described herein, the user's operational behavior for using the digital content may be received and packaged as the execution module, and the execution module may be associated with the channel number. The correlation between the channel number and the execution module is then recorded in then local channel list, and when then switch command that contains the channel number is received, the execution module corresponding to the channel number is obtained from the local channel list, so as to perform the operational behavior to use the digital content. Thereby, the digital content may be easily and effectively broadcast with use of the audio-video player. In addition, according to an embodiment of the invention, the audio-video server system may further include the remote device and the server, so as to enhance the flexibility of using the audio-video server system.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A channelization method of digital content suitable for being conducted on an audio-video player, the channelization method comprising:
receiving an operational behavior for using a digital content, wherein the operational behavior comprises a series of operational commands generated by an input operation, and the digital content includes one of a video clip, a music, a web-page, and an application program;
packaging the series of operational commands as an execution module, wherein the execution module comprises connecting the audio-video player to the internet, finding a user-desired online video clip through an online search engine and broadcasting the online video clip on the audio-video player;
associating the execution module with a channel number that has not been used;
recording a cos-relation between the channel number and the execution module in a local channel list; and obtaining the execution module corresponding to the channel number from the local channel list when a switch command comprising the channel number is received, so as to perform the series of operational commands packaged in the execution module for displaying one of the video clip, the music, the web-page, and the application program on the audio-video player.

2. The channelization method as recited in claim 1, wherein the audio-video player comprises an input unit, and after packaging the at least one operational command as the execution module, the channelization method further comprises:

receiving a channelization command from the input unit; and receiving a combination of numbers from the input unit to apply the combination of numbers as the channel number.

3. The channelization method as recited in claim 1, wherein the audio-video player is connected to a server through internet, and the channelization method further comprises:

uploading the correlation between the channel number and the execution module to a remote channel list; and periodically obtaining the correlation recorded in the remote channel list from the server, so as to update the local channel list of the audio-video player.

4. The channelization method as recited in claim 1, wherein the audio-video player is connected to an electronic device through internet, and the channelization method further comprises:

receiving the correlation between the channel number and the execution module from the electronic device, so as to update the local channel list.

5. The channelization method as recited in claim 1, before associating the execution module with the channel number, the channelization method further comprising:

receiving the channel number;

determining whether the channel number is used; and if the channel number is used, receiving another channel number.

6. The channelization method as recited in claim 1, wherein the step of performing the series of operational commands comprises:

performing a corresponding action corresponding to the series of operational commands.

7. The channelization method as recited in claim 1, wherein the step of performing the series of operational commands comprises:

displaying a search result of a search engine.

8. The channelization method as recited in claim 1, wherein the step of performing the series of operational commands comprises:

executing an application program corresponding to a memory address.

* * * * *